Oct. 13, 1942.   W. L. McGINLEY   2,299,025
STEERING WHEEL TRAY
Filed Aug. 2, 1940   2 Sheets-Sheet 1
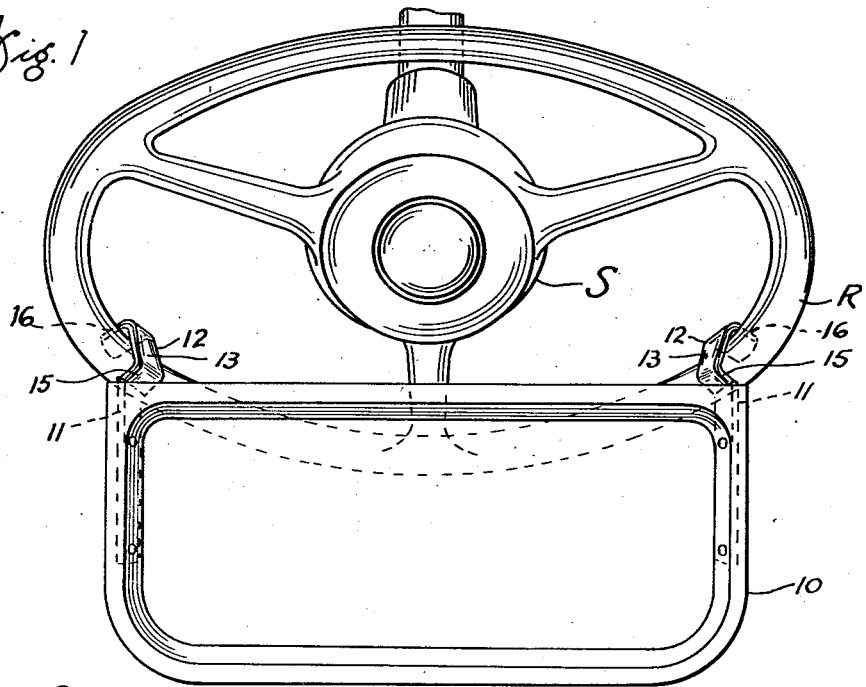
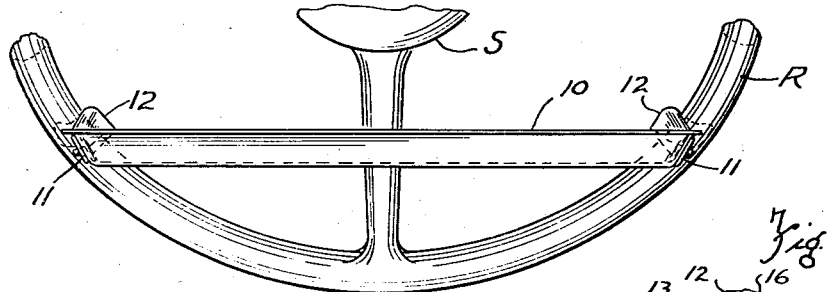
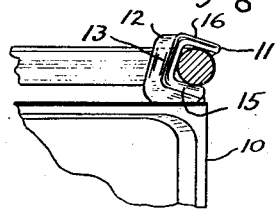
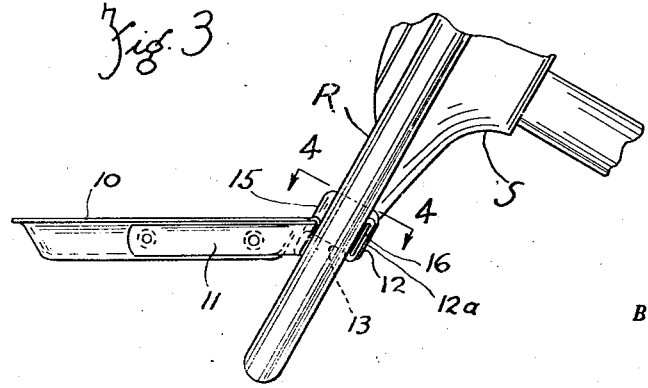
INVENTOR.
WM. L. McGINLEY
BY Ralph Barrow Oct. 13, 1942.  W. L. McGINLEY  2,299,025
STEERING WHEEL TRAY
Filed Aug. 2, 1940  2 Sheets-Sheet 2
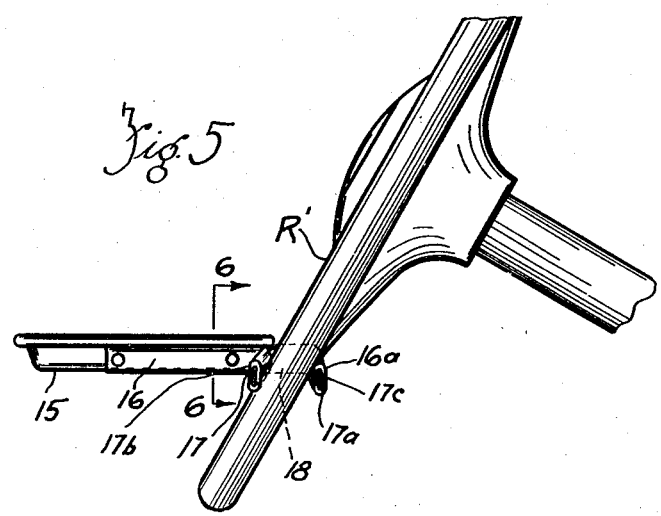
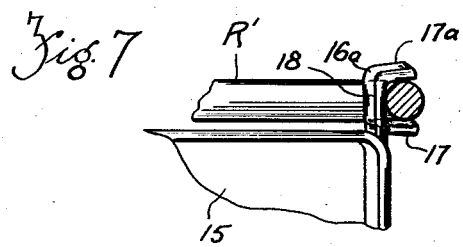
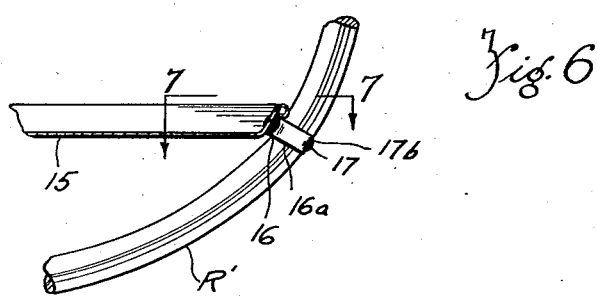
INVENTOR.
WM. L. McGINLEY
BY
J Ralph Barrow Patented Oct. 13, 1942

2,299,025

UNITED STATES PATENT OFFICE 2,299,025

STEERING WHEEL TRAY

William L. McGinley, Dallas, Tex.

Application August 2, 1940, Serial No. 350,045

6 Claims. (Cl. 311—22)

This invention relates to service trays for vehicles, and in particular relates to curb service trays for attachment to automobile steering wheels.

Various types of curb service trays have been provided on the market for quick attachment either on the outside or inside of automobile window frames. In the past when it has been desirable to position such trays on the inside of the vehicles, such as on rainy days, the so-called inside trays could not be satisfactorily positioned for the use of the driver of the vehicle because of interference with the steering wheel.

A general object of this invention is to provide a simple, compact, and inexpensive service tray for quick attachment in horizontal position to vehicle steering wheels, whereby drivers of vehicles may enjoy roadside refreshments in comfort.

A more particular object of the invention is to provide a service tray of the character described which may be detachably mounted in substantially horizontal position on steering wheel rims of a substantial range of sizes, or rims which are arranged at varying inclinations to the vertical.

Another object of the invention is to provide a service tray to be detachably supported on vehicle steering wheels, the means for detachably mounting the tray on the steering wheel being made more effective by the weight of articles placed on the tray.

These and other objects of the invention will be manifest from the following brief description and the accompanying drawings.

Of the accompanying drawings:

Figure 1 is a plan view of a tray embodying the invention, mounted on the steering wheel of an automobile.

Figure 2 is a front elevation, partly broken away, of Figure 1.

Figure 3 is an end elevation, as viewed from the right of Figure 2.

Figure 4 is a cross-section taken substantially on line 4—4 of Figure 3.

Figure 5 is a view similar to Figure 3, illustrating a modified form of tray applied on a steering wheel.

Figure 6 is a fragmentary cross-section taken substantially on line 6—6 of Figure 5.

Figure 7 is a fragmentary cross-section taken substantially on line 7—7 of Figure 6.

Referring particularly to Figures 1 to 4 of the drawings, the numeral 10 designates a flat-bottomed, rectangular tray of suitable material, such as aluminum or stainless steel. Secured to opposite ends of the tray may be oppositely disposed supporting members 11, 11, formed of strip metal to provide channel-shaped or U-shaped portions 12, 12, which extend rearwardly of the tray, as viewed in Figure 1. Cross-pieces 13, 13, of the channel-shaped portions may extend at downwardly converging angles (see Figure 1) for firm engagement with the inner periphery of the usual rim R of a steering wheel S at spaced points adjacent the bottom of the wheel. The spaced side portions or walls 15, 16 of each channel-shaped portion 12 may be formed in substantial parallelism in planes at angles to vertical to conform to the usual inclination to the horizontal of steering wheels, this inclination being substantially standard in present day automobiles. The channel-shaped portions 12 preferably are covered with rubber sleeves 12a to provide improved gripping action on the rim R and to prevent injury thereto. The channel-shaped portions 12, 12, may be hooked onto the inner periphery of the rim R, as shown, whereby the cross-pieces 13, 13 engaging downwardly against the rim will support the weight of the tray, and the tendency of the tray to tilt about the points of support, because of its weight, will be prevented by the spaced side portions or walls 15, 16, engaging axially opposite sides of the rim R with a binding action, arising from forces tending to cock or tilt the tray, thereby to maintain the tray in horizontal position.

The extreme distance between the outwardly extending ends of the outermost walls 16 of respective members 11 should not be greater than the inside diameter of a rim R of a steering wheel S, so that said side portions or walls 16 may be freely passed through the rim and engaged against the far side thereof. The side portions 16 preferably are so proportioned that the ends thereof will clear the inner periphery of steering wheel rims within a substantial range of rim diameters.

The hooked or channel-shaped portions 12, 12 preferably are formed so that no part thereof extends below the bottom of the tray 10, whereby the tray will rest firmly on a flat surface when not in use on a steering wheel. It will be seen that the construction of the members 11, 11, permits compactly stacking a plurality of such trays together when they are not in use.

In the use of the service tray described, the vehicle, of course, is not in motion. The steering wheel first is set in a position in which the spokes thereof will not interfere to prevent members 11 from being hooked onto rim R. The tray, either empty or loaded with articles, and while maintained in horizontal position, may then be moved inwardly and downwardly of the steering wheel rim R, to hook the channel-shaped or U-shaped ends 12 of members 11 onto said rim. The weight of the tray, alone or with articles thereon, will hold it firmly in horizontal position on the steering wheel rim, as previously described.

In Figures 5 to 7 are shown a modified form of the invention, the numeral 15a designating a flat, rectangular tray having oppositely disposed supporting members 16a secured on opposite ends thereof in a manner similar to that shown in Figure 1. Each member 16a may be formed of strip metal, with a channel-shaped or U-shaped portion 16b having outwardly diverging, spaced side portions or arms 17, 17a, in planes substantially vertical to the flat bottom of the tray, these spaced side portions of the respective members 16a being adapted to engage axially opposite sides of a steering wheel rim R' at spaced points to prevent tilting of the tray, and the inner portion 18 of the channel-shaped portions 16b being engageable with the inner periphery of the rim R' to support the tray. The outwardly diverging side portions 17, 17a of the channel shaped portions 16b permit reception therein of steering-wheel rims of a substantially wide range of cross-sectional thicknesses or diameters.

The sides 17, 17a of the members 16a, being in vertical planes, as described, the bottom edges of the sides 17 closely adjacent the tray will engage the near side of the rim R¹ of a steering wheel S¹, while the top edges of the sides 17 more remote from the tray will engage the far side of the rim, whereby the weight of the tray will apply firm binding action by its tendency to tilt about its points of support on the rim, the arrangement being such that the tray is held in horizontal position. The distance between the oppositely disposed extreme ends of the outermost side portions 17 of members 16a should be less than the largest interior diameter of the steering-wheel rim R' to permit said ends to be freely passed through the rim, in the manner previously described in connection with Figures 1 to 4. The rim engaging portions of the members 16a may be provided with rubber sleeves 17b, 17c, to prevent injury to the rim.

The use of the tray shown in Figures 5 to 7 is substantially as described in connection with Figures 1 to 4. In either case, however, the tray may be properly supported on the usual inclined steering wheel rim, solely by the binding or gripping action of the side portions or walls of the supporting members 11 or 16, produced by the weight of the tray tending to tilt the same on the steering wheel, and without the cross-pieces or inner portions 13 or 18 necessarily engaging downwardly against the inner periphery of the rim for such support.

Modifications of the invention may be resorted to provided they do not depart from the scope of the claims.

What is claimed is:

1. A service tray for use on vehicle steering wheels having rims in a plane angularly of the horizontal, comprising a receptacle, and oppositely disposed U-shaped members in transversely spaced relation on said receptacle and extending at the rear thereof with the arms of the U of each member extending outwardly in a direction transversely away from the other member, said U-shaped members being engageable downwardly with the inner portions of the U's against spaced points on the inner periphery of a steering wheel rim, the weight of the receptacle causing the oppositely disposed arms of each U to be bindingly engaged with opposite sides of said rim to hold the receptacle thereon.

2. A service tray for use on vehicle steering wheels having rims in a plane angularly of the horizontal, comprising a receptacle, and oppositely disposed U-shaped members in transversely spaced relation on said receptacle and extending rearwardly thereof with the spaced side portions of the U of each member extending outwardly in a direction transversely away from the other member, said members being engageable downwardly with the inner portions of the U's against spaced points on the periphery of a steering wheel rim, said spaced side portions of the U's of said members bindingly engaging opposite sides of said rim by reason of the weight of said receptacle to hold the same on the rim, said spaced side portions of the U's of said members being outwardly divergent for receiving steering wheel rims of varying thicknesses.

3. A service tray for use on vehicle steering wheels having rims in a plane angularly of the horizontal, comprising a receptacle, and oppositely disposed, U-shaped members formed of strip material mounted in transversely spaced relation on said receptacle and extending rearwardly thereof with the spaced side portions of the U of each member extending outwardly in a direction transversely away from the other member, said members being engageable downwardly with the inner portions of the U's against spaced points on the periphery of a steering wheel rim, said spaced side portions of the U's of said members bindingly engaging opposite sides of said rim by reason of the weight of said receptacle to hold the same on the rim, said inner portions of the U's of said members being at downwardly converging angles for conforming substantially to the converging lower portions of the steering wheel rim on which the tray is mounted.

4. A service tray for use on vehicle steering wheels having rims in a plane angularly of the horizontal, comprising a receptacle, and oppositely disposed U-shaped members formed of strip material mounted on said receptacle to extend rearwardly of the receptacle with the U's of each member opening in a direction transversely away from the other member, said members having oppositely disposed, downwardly converging inner portions for engaging the inner periphery of a steering wheel rim at spaced points adjacent the bottom thereof, the spaced side portions of said members bindingly engaging opposite sides of the steering wheel rim by reason of the weight of said receptacle to hold the same on the rim, said spaced portions of said members being inclined at acute angles to the horizontal to conform substantially to inclinations of steering wheels whereby the tray will be supported in a substantially horizontal position.

5. A service tray for use on vehicle steering wheels having rims in a plane angularly of the horizontal, comprising a receptacle, and oppositely disposed U-shaped members formed of flattened strip material mounted in transversely spaced relation on said receptacle and extending rearwardly thereof with the spaced side portions of the U of each member extending outwardly in a direction transversely away from the other member, said members being engageable downwardly with the inner portions of the U's against the inner periphery of a steering wheel rim at spaced points adjacent the bottom thereof, the weight of said receptacle causing said spaced portions of the U's of said members to be bindingly engaged with opposite sides of said rim to hold the receptacle thereon.

6. A service tray as set forth in claim 5, said receptacle having a flat bottom and inwardly tapered marginal flanges whereby two or more like receptacles are adapted to be nested one within the other, said rearwardly extending U-shaped members being arranged above the flat bottom of the receptacle to permit supporting the tray on a flat surface when not mounted on a steering wheel.

WILLIAM L. McGINLEY.